(12) United States Patent
Kanai (10) Patent No.: US 9,163,710 B2
(45) Date of Patent: Oct. 20, 2015

(54) WAVE GEAR DEVICE AND FLEXIBLE EXTERNALLY TOOTHED GEAR

(75) Inventor: Satoru Kanai, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 312 days.

(21) Appl. No.: 13/812,090

(22) PCT Filed: May 31, 2012

(86) PCT No.: PCT/JP2012/003614
§ 371 (c)(1),
(2), (4) Date: Jan. 24, 2013

(87) PCT Pub. No.: WO2013/179353
PCT Pub. Date: Dec. 5, 2013

(65) Prior Publication Data
US 2013/0319174 A1    Dec. 5, 2013

(51) Int. Cl.
*F16H 33/10* (2006.01)
*F16H 35/00* (2006.01)
*F16H 49/00* (2006.01)

(52) U.S. Cl.
CPC ............ *F16H 35/00* (2013.01); *F16H 49/001* (2013.01); *Y10T 74/19* (2015.01)

(58) Field of Classification Search
CPC ........ F16H 35/00; F16H 49/001; Y10T 74/19
USPC .................................. 74/640; 475/162; 901/1
See application file for complete search history.

(56) References Cited

U.S. PATENT DOCUMENTS

| 3,001,840 | A |   | 9/1961  | Musser |          |
|-----------|---|---|---------|--------|----------|
| 3,128,641 | A | * | 4/1964  | Walton | 74/640  |
| 3,196,713 | A | * | 7/1965  | Robinson | 74/640 |
| 3,986,412 | A | * | 10/1976 | Farley | 74/661  |
| 4,840,090 | A | * | 6/1989  | Iwata  | 74/640  |

(Continued)

FOREIGN PATENT DOCUMENTS

| DE | 4111661 A1 | * | 10/1992 | ........... F16H 1/32 |
| JP | 63-180751 A |  | 7/1988 | |

(Continued)

OTHER PUBLICATIONS

International Search Report (PCT/ISA/210) issued on Aug. 8, 2012, by the Japanese Patent Office as the International Searching Authority for International Application No. PCT/JP2012/003614.

*Primary Examiner* — Ha D Ho
(74) *Attorney, Agent, or Firm* — Buchanan Ingersoll & Rooney PC (57) ABSTRACT

In a hollow wave gear device, a rigid internally toothed gear and a wave generator are disposed adjacent along a center axis line so as to enclose a cylindrical barrel part of a flexible externally toothed gear from the outside. A pushed cylindrical portion adjacent to an external-tooth-formed cylindrical portion of the cylindrical barrel part is pushed from the outside and made to flex into an ellipsoidal shape by the wave generator disposed on the outside thereof, whereby external teeth partially mesh with internal teeth of the rigid internally toothed gear. The inside diameter dimension of a hollow part can be the inside diameter of the cylindrical barrel part of the flexible externally toothed gear, and a hollow wave gear device can be achieved which is formed with a hollow part having a large inside diameter.

15 Claims, 6 Drawing Sheets

(a)

(b)

(56) References Cited

U.S. PATENT DOCUMENTS

| | | | |
|---|---|---|---|
| 4,969,376 A * | 11/1990 | Fickelscher | 74/640 |
| 5,016,491 A * | 5/1991 | Poro | 74/640 |
| 7,409,891 B2 | 8/2008 | Takemura | |
| 7,453,176 B2 * | 11/2008 | Davison | 310/75 R |
| 2007/0039414 A1 * | 2/2007 | Takemura | 74/640 |
| 2007/0204723 A1 * | 9/2007 | Saito | 74/640 |

FOREIGN PATENT DOCUMENTS

| | | | | |
|---|---|---|---|---|
| JP | 05141486 A | * | 6/1993 | F16H 1/32 |
| JP | 2009-156462 A | | 7/2009 | |
| JP | 2009-257510 A | | 11/2009 | |
| JP | 2012-72912 A | | 4/2012 | |
| WO | WO 2006-003847 A1 | | 1/2006 | |

* cited by examiner

WAVE GEAR DEVICE AND FLEXIBLE EXTERNALLY TOOTHED GEAR

TECHNICAL FIELD

The present invention relates to a wave gear device capable of effectively utilizing an internal space of a flexible externally toothed gear thereof.

BACKGROUND ART

One known example of a wave gear device is what is known as a silk-hat-type device, such as is disclosed in Patent Document 1. In this type of wave gear device, a hollow part having a large inside diameter passing through the device along the center axis line is readily formed in the center of the device, and the hollow part can be used as space for wiring or the like.

In a silk-hat-type wave gear device, a flexible externally toothed gear disposed on the inside of a rigid internally toothed gear has a silk hat shape. The flexible externally toothed gear comprises a cylindrical barrel part capable of flexing in the radial direction, a diaphragm extending outward in the radial direction from one end of the barrel part, and a thick annular boss formed as a continuation of the external peripheral edge of the diaphragm. The region on the side of the open edge, which is the side opposite the diaphragm in the cylindrical barrel part, is an external-tooth-formation portion, where external teeth are formed in the external peripheral surface.

The flexible externally toothed gear is made to flex into an ellipsoidal shape by an ellipsoidally contoured wave generator mounted to the inside of the external-tooth-formation portion, and the flexible externally toothed gear is partially meshed with the rigid internally toothed gear. When the wave generator is rotated, the meshing positions of the two gears move in the circumferential direction, and relative rotation occurs between the two gears, the rotation corresponding to the difference in the number of teeth between the two gears. One gear is fixed in place so as to not rotate, whereby reduced rotation is outputted from the other gear. The wave generator is configured from an annular rigid cam plate, and a wave bearing mounted to the ellipsoidally contoured external peripheral surface of the cam plate. In the silk-hat-type wave gear device, the inside diameter of the hollow part of the wave gear device is stipulated by the inside diameter of a hollow hole in the wave generator, i.e. a hollow hole formed in the cam plate.

Another known example of a wave gear device is what is referred to as a cup-type device such as is disclosed in Patent Document 2. In this type of wave gear device, a flexible externally toothed gear disposed on the inside of a rigid internally toothed gear has a cup shape. The flexible externally toothed gear comprises a cylindrical barrel part capable of flexing in the radial direction, a diaphragm extending inward in the radial direction from one end of the barrel part, and a thick annular or discoid boss formed as a continuation of the internal peripheral edge of the diaphragm. The region on the side of the open edge, which is the side opposite the diaphragm in the cylindrical barrel part, is an external-tooth-formation portion, where external teeth are formed in the external peripheral surface.

The flexible externally toothed gear is made to flex into an ellipsoidal shape by an ellipsoidally contoured wave generator mounted to the inside of the external-tooth-formation portion, and the flexible externally toothed gear is partially meshed with the rigid internally toothed gear. When the wave generator is rotated, the meshing positions of the two gears move in the circumferential direction, and relative rotation occurs between the two gears, the rotation corresponding to the difference in the number of teeth between the two gears. One gear is fixed in place so as to not rotate, whereby reduced rotation is outputted from the other gear. One gear is fixed in place so as to not rotate, whereby reduced rotation is outputted from the other gear. The wave generator is configured from an annular rigid cam plate, a wave bearing mounted to the ellipsoidally contoured external peripheral surface of the cam plate.

Yet another known example of a wave gear device is what is referred to as a flat-type device such as is disclosed in Patent Document 3. In this type of wave gear device, a flexible externally toothed gear disposed on the inside of a rigid internally toothed gear has a simple shape comprising a cylindrical barrel part capable of flexing in the radial direction, and external teeth formed on the circular external peripheral surface of the cylindrical barrel part.

Two rigid internally toothed gears are disposed in parallel on the outer side of the flexible externally toothed gear. The flexible externally toothed gear is made to flex into an ellipsoidal shape by the ellipsoidally contoured wave generator mounted to the inner side of the flexible externally toothed gear, and the flexible externally toothed gear is partially meshed with the rigid internally toothed gears. When the wave generator is rotated, the meshing positions of the flexible externally toothed gear and the two rigid internally toothed gears move in the circumferential direction. One rigid internally toothed gear has the same number of teeth as the flexible externally toothed gear, and the other rigid internally toothed gear has more teeth than the flexible externally toothed gear. Therefore, the flexible externally toothed gear rotates integrally with the rigid internally toothed gear that has the same number of teeth, and relative rotation occurs with the rigid internally toothed gear that has a different number of teeth, the rotation corresponding to the difference in the number of teeth between the two gears. One rigid internally toothed gear is fixed in place so as to not rotate, whereby reduced rotation is outputted from the other rigid internally toothed gear. The wave generator is configured from an annular rigid cam plate, and a wave bearing mounted to the ellipsoidally contoured external peripheral surface of the cam plate.

PRIOR ART DOCUMENTS

Patent Documents

[Patent Document 1] JP-A 2009-257510
[Patent Document 2] JP-A 2012-072912
[Patent Document 3] JP-A 2009-156462

SUMMARY OF THE INVENTION

Problems the Invention is Intended to Solve

In a conventional silk-hat-type wave gear device, the inside diameter of the hollow part of the wave gear device is stipulated by the hollow hole formed in the wave generator mounted to the inner side of the silk-hat-shaped flexible externally toothed gear. In other words, the diameter of the hollow hole in the wave generator is a restriction, and the inside diameter of the hollow part of the wave gear device cannot be increased.

In a conventional cup-shaped wave gear device, the wave generator is disposed on the side of the open edge of the cup-shaped flexible externally toothed gear. Therefore, a large dead space sealed by the wave generator forms readily in the inner side of the cup-shaped flexible externally toothed gear.

Furthermore, in a conventional flat-type wave gear device, the inside diameter of the hollow part of the wave gear device is stipulated by the hollow hole formed in the wave generator mounted to the inner side of the cylindrical flexible externally toothed gear. In other words, the diameter of the hollow hole in the wave generator is a restriction, and the inside diameter of the hollow part of the wave gear device cannot be increased.

An object of the present invention is to provide a silk-hat-type wave gear device comprising a hollow part having a large inside diameter, and a silk-hat-type flexible externally toothed gear used for this device.

Another object of the present invention is to provide a cup-shaped wave gear device wherein the inside diameter of a cup-shaped flexible externally toothed gear can be effectively utilized as space for installing components, wiring, and the like; and a cup-shaped flexible externally toothed gear used for this device.

Furthermore, an object of the present invention is to provide a flat-type wave gear device comprising a hollow part having a large inside diameter, and a flexible externally toothed gear used for this device.

Means for Solving the Problems

In the wave gear device of the present invention, an external-tooth-formation portion in a flexible externally toothed gear, and a pushed portion pushed by the wave generator and made to flex into an ellipsoidal shape in the flexible externally toothed gear, are formed positions displaced along a center axis line of the flexible externally toothed gear. A wave generator, which is disposed on the outside of a cylindrical barrel part of the flexible externally toothed gear, pushes the pushed portion radially inward from the outside and causes the pushed portion to flex into an ellipsoidal shape.

Specifically, conventionally, the external-tooth-formation portion in the cylindrical barrel part of the flexible externally toothed gear has been made to flex into an ellipsoidal shape by the wave generator, and the external-tooth-formation portion and the pushed portion pushed by the wave generator have been in the same region. Therefore, the wave generator has been disposed on the inside of the external-tooth-formation portion of the flexible externally toothed gear, and the internal peripheral surface of the external-tooth-formation portion has been pushed outward from the inside, causing the external-tooth-formation portion to flex into an ellipsoidal shape.

In the present invention, however, the external-tooth-formation portion and the pushed portion are formed in the cylindrical barrel part of the flexible externally toothed gear in different positions along the center axis line, positions that are typically adjacent to each other. Because the external-tooth-formation portion and the pushed portion are displaced along the center axis line, the wave generator can be disposed on the outside of the cylindrical barrel part of the flexible externally toothed gear, and the pushed portion can be pushed inward from the outside to cause the pushed portion to flex into an ellipsoidal shape. Because the cylindrical barrel part as a whole flexes into an ellipsoidal shape and the external-tooth-formation portion also flexes into an ellipsoidal shape when the pushed portion is made to flex into an ellipsoidal shape, a state can be formed in which the external teeth formed in the external-tooth-formation portion partially mesh with the internal teeth of the rigid internally toothed gear.

Effects of the Invention

In the wave gear device of the present invention, because the wave generator is disposed on the outside of the cylindrical barrel part of the flexible externally toothed gear, the internal space of the cylindrical barrel part of the flexible externally toothed gear can be effectively utilized.

In the case of a silk-hat-type wave gear device, a hollow part extending through the center of the device along the center axis line is formed by the internal peripheral surface of the cylindrical barrel part of the silk-hat-shaped flexible externally toothed gear. Unlike conventional cases in which the inside diameter of the hollow part is limited by a hollow hole formed in the wave generator which is inside the flexible externally toothed gear, a hollow wave gear device can be achieved which comprises a hollow part having a large inside diameter.

In the case of a cup-type wave gear device, because the wave generator is disposed on the outside of the cup-shaped flexible externally toothed gear, the opening in the flexible externally toothed gear is not sealed by the wave generator. Consequently, the inside of the cup-shaped flexible externally toothed gear is not dead space, and the internal space can be effectively utilized as a space for installing components, space for wiring, or the like.

In the case of a flat-type wave gear device, a hollow part passing through the center of the device along the center axis line is formed by the internal peripheral surface of the cylinder-shaped flexible externally toothed gear. Unlike conventional cases in which the inside diameter of the hollow part is limited by a hollow hole formed in the wave generator which is inside the flexible externally toothed gear, a hollow wave gear device can be achieved which comprises a hollow part having a large inside diameter.

In the present invention, the rigid internally toothed gear and the wave generator, which are to be supplied with lubricant or coated with grease, are arrayed on the outside of the flexible externally toothed gear. Therefore, compared to conventional cases in which the rigid internally toothed gear is disposed on the outside of the flexible externally toothed gear and the wave generator is disposed on the inside, advantages of the present invention are that the range supplied with lubricant or the range coated with grease can be reduced, and these regions can be more easily lubricated.

BRIEF DESCRIPTION OF THE DRAWINGS

FIG. 1(a) is a schematic longitudinal cross-sectional view showing an embodiment of a silk-hat-type wave gear device to which the present invention is applied, and (b) is a schematic end surface view of the same;

FIG. 2(a) is a longitudinal cross-sectional view schematically showing the flexed state of the silk-hat-type flexible externally toothed gear of FIG. 1, and (b) is a transverse cross-sectional view of the same;

FIG. 3(a) is a schematic cross-sectional view showing an embodiment of a cup-type wave gear device to which the present invention is applied, and (b) is a schematic end surface view of the same;

FIG. 4(a) is a longitudinal cross-sectional view schematically showing the flexed state of the cup-shaped flexible externally toothed gear of FIG. 3, and (b) is a transverse cross-sectional view of the same;

FIG. 5(a) is a schematic cross-sectional view showing an embodiment of a flat-type wave gear device to which the present invention is applied, and (b) is a schematic end surface view of the same.

MODE FOR CARRYING OUT THE INVENTION

Embodiments of a wave gear device to which the present invention is applied are described hereinbelow with reference to the drawings.

Embodiment 1

Silk-Hat-Type Hollow Wave Gear Device

Referring to FIGS. 1(a) and 1(b), a silk-hat-type hollow wave gear device 1 has an annular rigid internally toothed gear 2, a silk-hat-shaped flexible externally toothed gear 3 disposed coaxially on the inner side of the rigid internally toothed gear 2, and a wave generator 4 disposed in a position adjacent to the rigid internally toothed gear 2 on the outer side of the flexible externally toothed gear 3. The wave generator 4 causes the flexible externally toothed gear 3 to flex into an ellipsoidal shape, forming a state in which external teeth 5 of the flexible externally toothed gear 3 mesh with internal teeth 6 of the rigid internally toothed gear 2 at two locations (portions positioned on the major axis) separated 180 degrees in the circumferential direction.

When the wave generator 4 is rotated by a motor or another high-speed rotation drive source about a center axis line 1a of the hollow wave gear device 1, the meshing positions of the external teeth 5 in the internal teeth 6 move in the circumferential direction. The number of external teeth 5 is fewer by 2n (n being a positive integer) than the number of internal teeth 6. Commonly, there are two fewer external teeth 5. When the meshing positions of the gears 2, 3 move in the circumferential direction, relative rotation occurs between the two gears according to the difference in the number of teeth between the two gears. One gear is fixed so as to not rotate, and output rotation is acquired from the other gear.

The flexible externally toothed gear 3 includes a cylindrical barrel part 11 capable of flexing in the radial direction, a diaphragm 12 extending radially outward from one end 11a of the cylindrical barrel part 11, and a thick annular boss 13 formed as a continuation of the external peripheral edge of the diaphragm 12. A plurality of bolt holes 14a are formed in the boss 13 at predetermined intervals along the circumferential direction, enabling the boss to be connected and fixed to a fixed-side member or a load-side member (not shown).

The cylindrical barrel part 11 has a cylindrical portion 15 of a constant length extending along the center axis line 1a from the side of the diaphragm 12, an external-teeth-formed cylindrical portion 16 continuing from the cylindrical portion and having the external teeth 5 formed thereon, and a pushed cylindrical portion 17 continuing from the external-tooth-formed cylindrical portion. The distal end edge of the pushed cylindrical portion 17 is the other end of the cylindrical barrel part 11 of the flexible externally toothed gear 3, and this end constitutes an open edge 11b. The pushed cylindrical portion 17 is a portion pushed from the outside to the inside and made to flex into an ellipsoidal shape by the wave generator 4, as is described hereinafter.

The rigid internally toothed gear 2 is disposed so as to enclose the external-tooth-formed cylindrical portion 16 concentrically. Bolt holes 18, 19 are formed at predetermined angle intervals along the circumferential direction in the rigid internally toothed gear 2, enabling the rigid internally toothed gear to be connected and fixed to a fixed-side member or a load-side member (not shown).

The wave generator 4 is disposed in a position adjacent to the rigid internally toothed gear 2 on the side of the open edge 11b in the direction of the center axis line 1a, so as to concentrically enclose the pushed cylindrical portion 17 of the cylindrical barrel part 11. The wave generator 4 comprises a rigid annular member 21 and a wave bearing 22 attached to the inner side of the annular member. The inner peripheral surface 23 of the annular member 21 is a surface of constant width having an ellipsoidal contour. The wave bearing 22 comprises an outer ring 24 and an inner race 25 capable of flexing in the radial direction, which are attached to the ellipsoidally contoured inner peripheral surface 23 and made to flex into an ellipsoidal shape, and balls 26 are inserted so as to be capable of rolling in the ellipsoidal trajectory formed between the rings. The pushed cylindrical portion 17 of the cylindrical barrel part 11 of the flexible externally toothed gear 3 is fitted into the inside surface of the ellipsoidally flexed inner race 25, and made to flex into an ellipsoidal shape.

Figure 2:
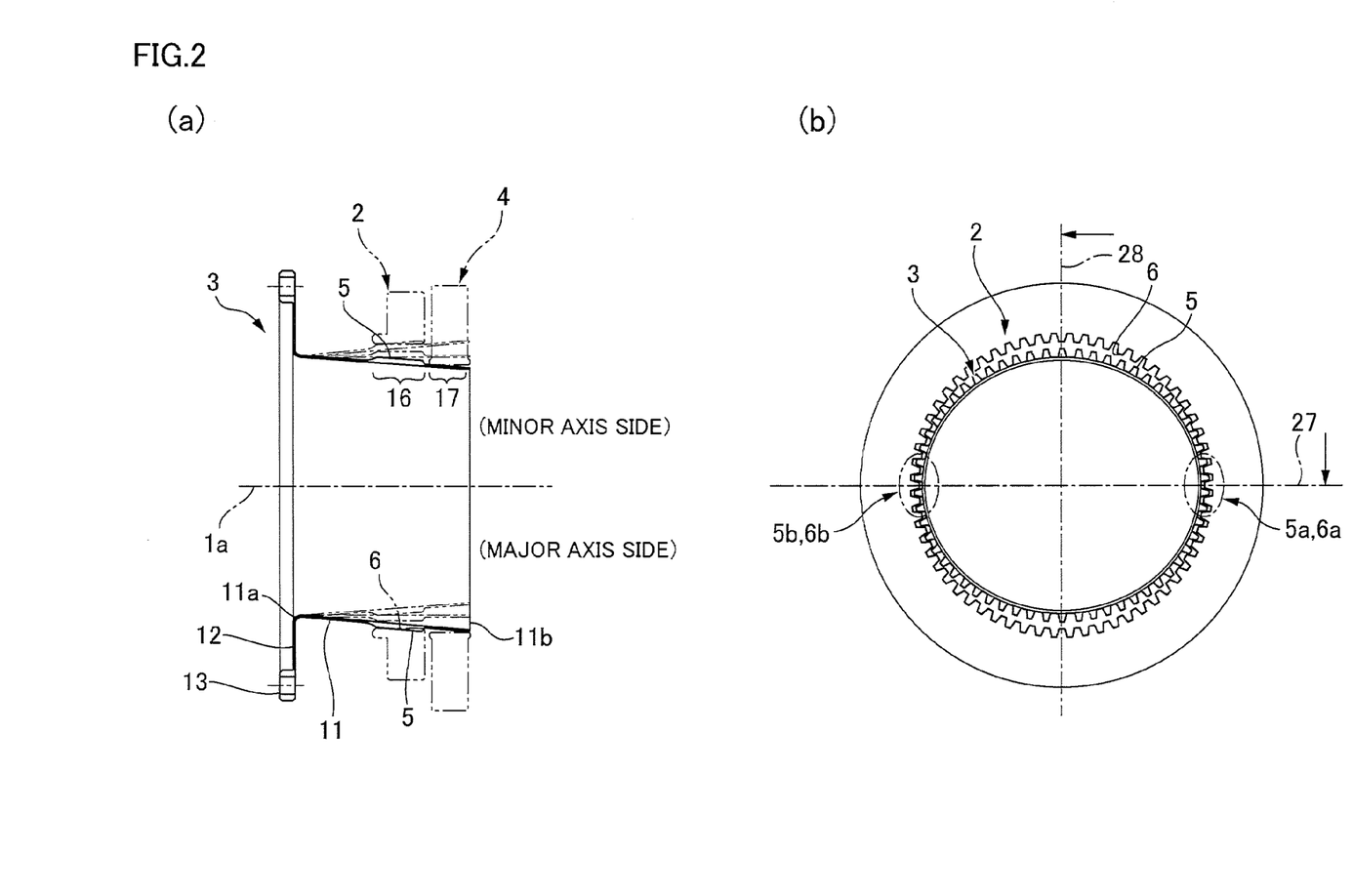

FIG. 2(a) is a longitudinal cross-sectional view schematically showing the flexed state of the flexible externally toothed gear 3, and FIG. 2(b) is a transverse cross-sectional view schematically showing the flexed state of the flexible externally toothed gear 3 and the meshed state with the rigid internally toothed gear 2. The pushed cylindrical portion 17 of the cylindrical barrel part 11 is pushed inward along the radius from the outside and made to flex into an ellipsoidal shape by the wave generator 4. The cylindrical barrel part 11 thereby flexes as a whole into an ellipsoidal shape. The amount of flexure increases according to the distance from the diaphragm 12, from the end 11a in the side having the diaphragm 12 toward the open edge 11b on the opposite side.

As shown in the bottom half portion of FIG. 2(a), the amount of flexure gradually increases in a positive direction according to the distance from the diaphragm 12 in a position on the major axis 27 of the ellipse, and as shown in the top half portion of the same drawing, the amount of flexure gradually increases in a negative direction in a position on the minor axis 28 of the ellipse. As a result, the external-tooth-formed cylindrical portion 16 also flexes into an ellipsoidal shape, being adjacent to the pushed cylindrical portion 17 which is flexed into an ellipsoidal shape by the wave generator 4. Consequently, the external teeth 5 of the external-teeth cylindrical portion 16 also flex into an ellipsoidal shape, and a state is formed in which external teeth portions 5a, 5b in positions on the major axis 27 are meshed with internal teeth portions 6a, 6b in the rigid internally toothed gear 2.

Therefore, the wave generator 4 disposed on the outer side of the flexible externally toothed gear 3 functions in the same manner as a wave generator disposed in a position facing the rigid internally toothed gear 2 in the inner side of the flexible externally toothed gear 3, as is the case in conventional practice.

Figure 1:
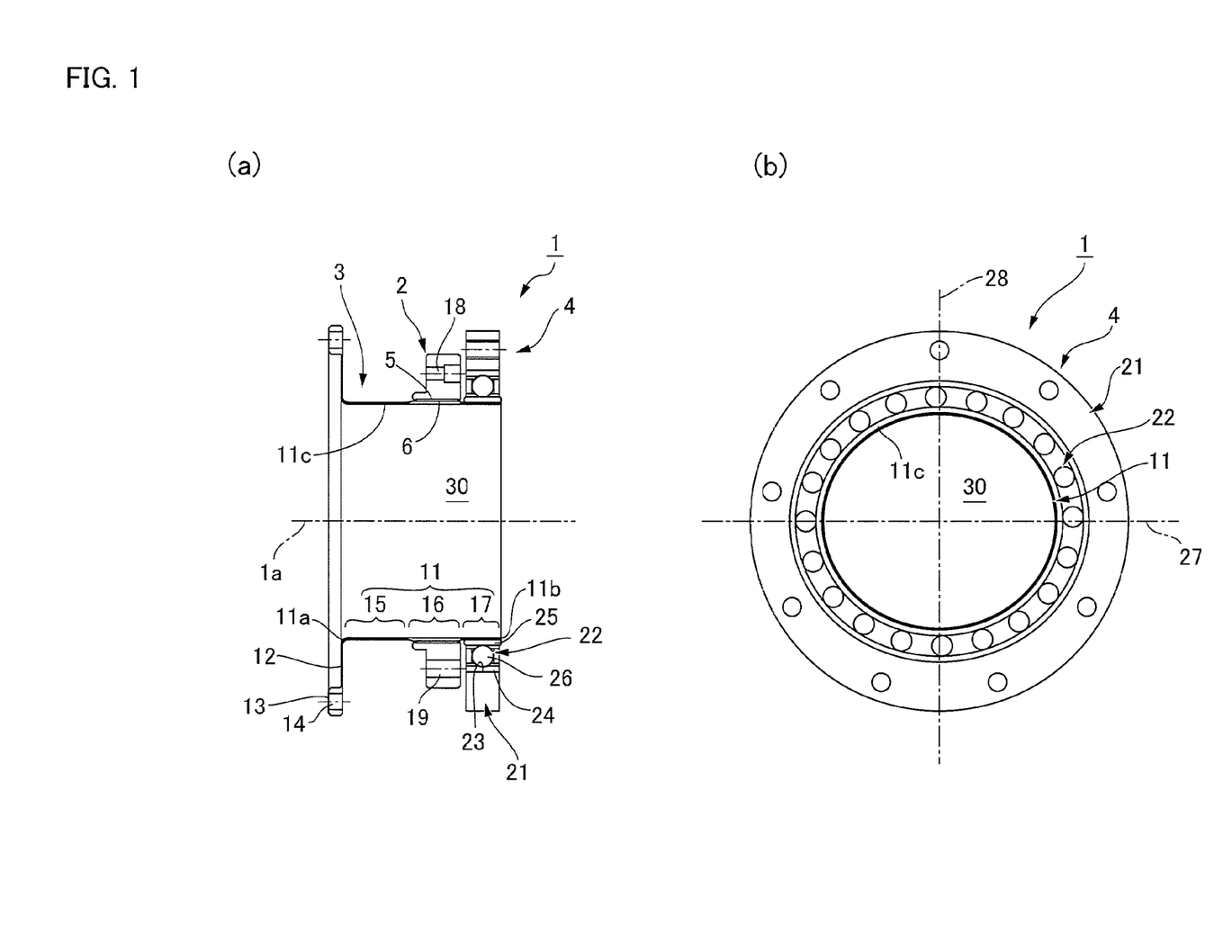

Referring again to FIG. 1, in the silk-hat-type hollow wave gear device 1 configured in this manner, a hollow part 30 is formed extending through the center of the device in the direction of the center axis line 1a. This hollow part 30 is stipulated by the internal peripheral surface 11c of the cylindrical barrel part 11 of the flexible externally toothed gear 3.

Therefore, according to the hollow wave gear device 1, unlike cases in which a wave gear device is disposed on the inner side of the cylindrical barrel part 11 of the flexible externally toothed gear 3, the inside diameter dimension of the hollow part 30 is not restricted by the inside diameter dimension of the through-hole formed in the wave generator, and the inside diameter dimension of the hollow part 30 can be formed much larger than in conventional practice.

The rigid internally toothed gear 2 and the wave generator 4 are disposed in adjacent positions on the outer side of the flexible externally toothed gear 3. Therefore, the grease-coated range is smaller than in cases in which these regions are disposed on the outer side and inner side of the flexible externally toothed gear 3. Consequently, these regions can be lubricated efficiently.

In the example above, relative to the rigid internally toothed gear 2, the wave generator 4 is disposed in the open edge 11b side of the flexible externally toothed gear 3. Relative to the rigid internally toothed gear 2, the wave generator 4 can also be disposed in the diaphragm 12 side of the flexible externally toothed gear 3. Specifically, the pushed cylindrical portion 17 can be disposed adjacent to the diaphragm 12 side, relative to the external-tooth-formed cylindrical portion 16. It is also possible for the pushed cylindrical portion 17 to be formed separated from the external-tooth-formed cylindrical portion 16 by a predetermined distance in the direction of the center axis line 1a.

Embodiment 2

Cup-Shaped Wave Gear Device

FIG. 3(a) is a schematic cross-sectional view showing an embodiment of a cup-shaped wave gear device to which the present invention is applied, and (b) is a schematic end surface view of the same. Referring to these drawings for the description, a cup-shaped wave gear device 41 comprises an annular rigid internally toothed gear 42, a cup-shaped flexible externally toothed gear 43 disposed coaxially on the inside of the rigid internally toothed gear 42, and a wave generator 44 disposed in a position adjacent to the rigid internally toothed gear 42 on the outside of the flexible externally toothed gear 43. The wave generator 44 causes the flexible externally toothed gear 43 to flex into an ellipsoidal shape, forming a state in which external teeth 45 of the flexible externally toothed gear 43 are meshed with internal teeth 46 of the rigid internally toothed gear 42 in two locations (portions positioned on the major axis) separated by 180 degrees in the circumferential direction.

When the wave generator 44 is rotated about a center axis line 41a of the wave gear device 41 by a motor or another high-speed rotation drive source, the positions where the external teeth 45 mesh with the internal teeth 46 move in the circumferential direction. The number of external teeth 45 is fewer by 2n (n being a positive integer) than the number of internal teeth 46. Commonly, there are two fewer external teeth. When the meshing positions of the two gears 42, 43 move, relative rotation occurs between the two gears, the rotation corresponding to the difference in the number of teeth between the two gears. One gear is fixed in place so as to not rotate, and output rotation is acquired from the other gear.

The flexible externally toothed gear 43 includes a cylindrical barrel part 51 capable of flexing in the radial direction, a diaphragm 52 extending radially inward from one end 51a of the cylindrical barrel part 51, and a thick annular boss 53 formed as a continuation of the internal peripheral edge of the diaphragm 52. A plurality of bolt holes 54 are formed in the boss 53 at predetermined intervals along the circumferential direction, enabling the boss to be connected and fixed to a fixed-side member or a load-side member (not shown).

The cylindrical barrel part 51 has a cylindrical portion 55 of a constant length extending along a center axis line 41a from the side of the diaphragm 52, an external-tooth-formed cylindrical portion 56 continuing from the cylindrical portion 55 and having the external teeth 45 formed thereon, and a pushed cylindrical portion 57 continuing from the external-tooth-formed cylindrical portion. The distal end edge of the pushed cylindrical portion 57 is the other end of the cylindrical barrel part 51 of the flexible externally toothed gear 43, and this end constitutes an open edge 51b. The pushed cylindrical portion 57 is a portion pushed from the outside to the inside and made to flex into an ellipsoidal shape by the wave generator 44, as is described hereinafter.

The rigid internally toothed gear 42 is disposed so as to enclose the external-tooth-formed cylindrical portion 56 concentrically. Bolt holes 58 are formed at predetermined angle intervals along the circumferential direction in the rigid internally toothed gear 42, enabling the rigid internally toothed gear to be connected and fixed to a fixed-side member or a load-side member (not shown).

The wave generator 44 is disposed in a position adjacent to the rigid internally toothed gear 42 on the side of the open edge 51b in the direction of the center axis line 41a, so as to concentrically enclose the pushed cylindrical portion 57 of the cylindrical barrel part 51. The wave generator 44 comprises a rigid annular member 61 and a wave bearing 62 attached to the inner side of the annular member. The inner peripheral surface 63 of the annular member 61 is a surface of constant width having an ellipsoidal contour. The wave bearing 62 comprises an outer race 64 and an inner race 65 capable of flexing in the radial direction, which are attached to the ellipsoidally contoured inner peripheral surface 63 and made to flex into an ellipsoidal shape, and balls 66 are inserted so as to be capable of rolling in the ellipsoidal trajectory formed between the races. The pushed cylindrical portion 57 of the cylindrical barrel part 51 of the flexible externally toothed gear 43 is fitted into the inside surface of the ellipsoidally flexed inner race 65, and made to flex into an ellipsoidal shape.

Figure 4:
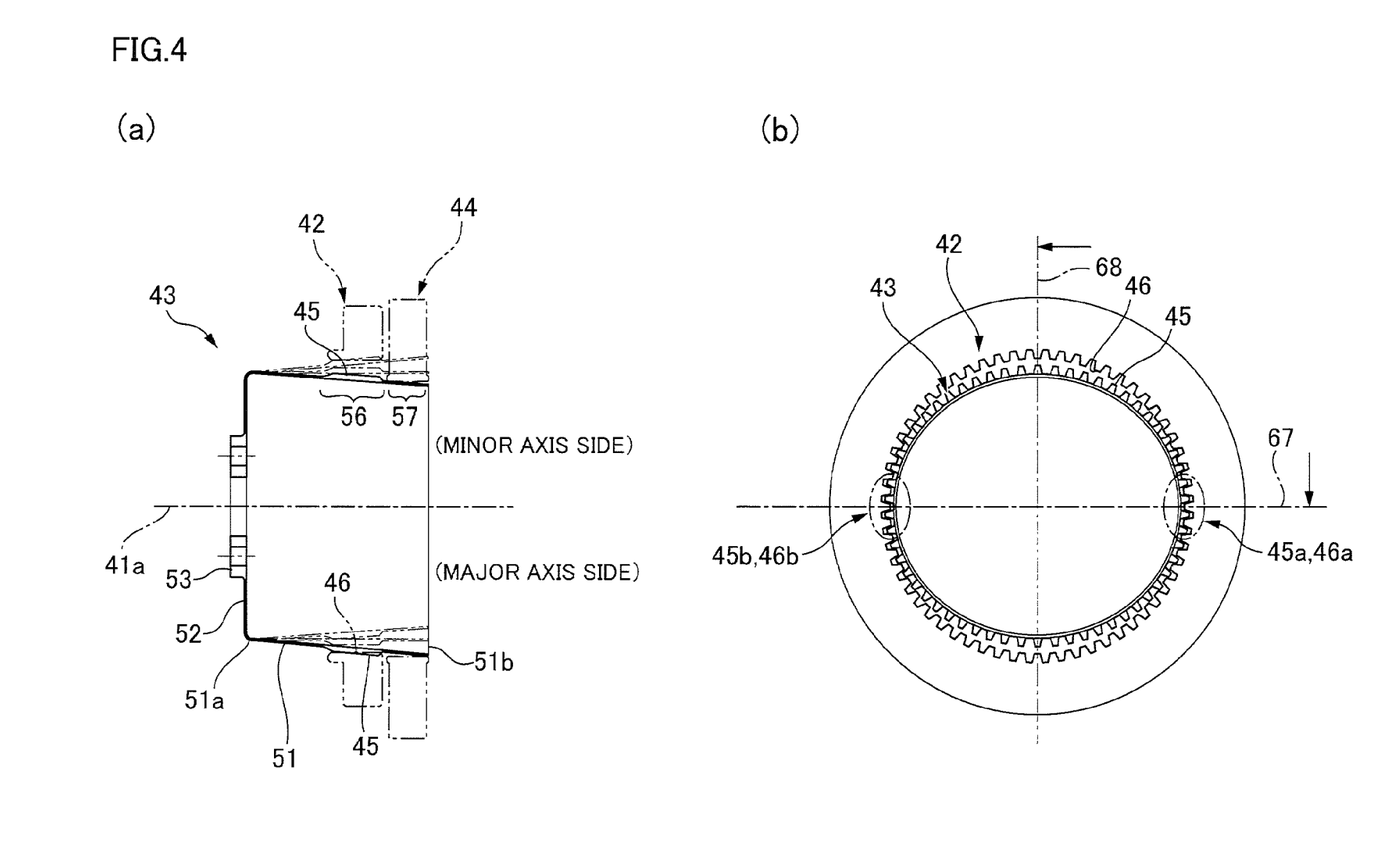

FIG. 4(a) is a longitudinal cross-sectional view schematically showing the flexed state of the flexible externally toothed gear 43, and FIG. 4(b) is a transverse cross-sectional view schematically showing the flexed state of the flexible externally toothed gear 43 and the meshed state with the rigid internally toothed gear 42. The pushed cylindrical portion 57 of the cylindrical barrel part 51 is pushed inward along the radius from the outside and made to flex into an ellipsoidal shape by the wave generator 44, and the cylindrical barrel part 51 thereby flexes as a whole into an ellipsoidal shape. The amount of flexure increases according to the distance from the diaphragm 52, from the end 51a in the side having the diaphragm 52 toward the open edge 51b on the opposite side.

As shown in the bottom half portion of FIG. 4(a), the amount of flexure gradually increases in a positive direction according to the distance from the diaphragm 52 in a position on the major axis 67 of the ellipse, and as shown in the top half portion of the same drawing, the amount of flexure gradually increases in a negative direction in a position on the minor axis 68 of the ellipse. As a result, the external-tooth-formed cylindrical portion 56 also flexes into an ellipsoidal shape, being adjacent to the pushed cylindrical portion 57 which is flexed into an ellipsoidal shape by the wave generator 44. Consequently, the external teeth 45 of the external-tooth-formed cylindrical portion 56 also flex into an ellipsoidal shape, and a state is formed in which external teeth portions 45a, 45b in positions on the major axis 67 are meshed with internal teeth portions 46a, 46b in the rigid internally toothed gear 42.

Therefore, the wave generator 44 disposed on the outer side of the flexible externally toothed gear 43 functions in the same manner as a wave generator disposed in a position facing the rigid internally toothed gear 42 in the inner side of the flexible externally toothed gear 43, as is the case in conventional practice.

Figure 3:
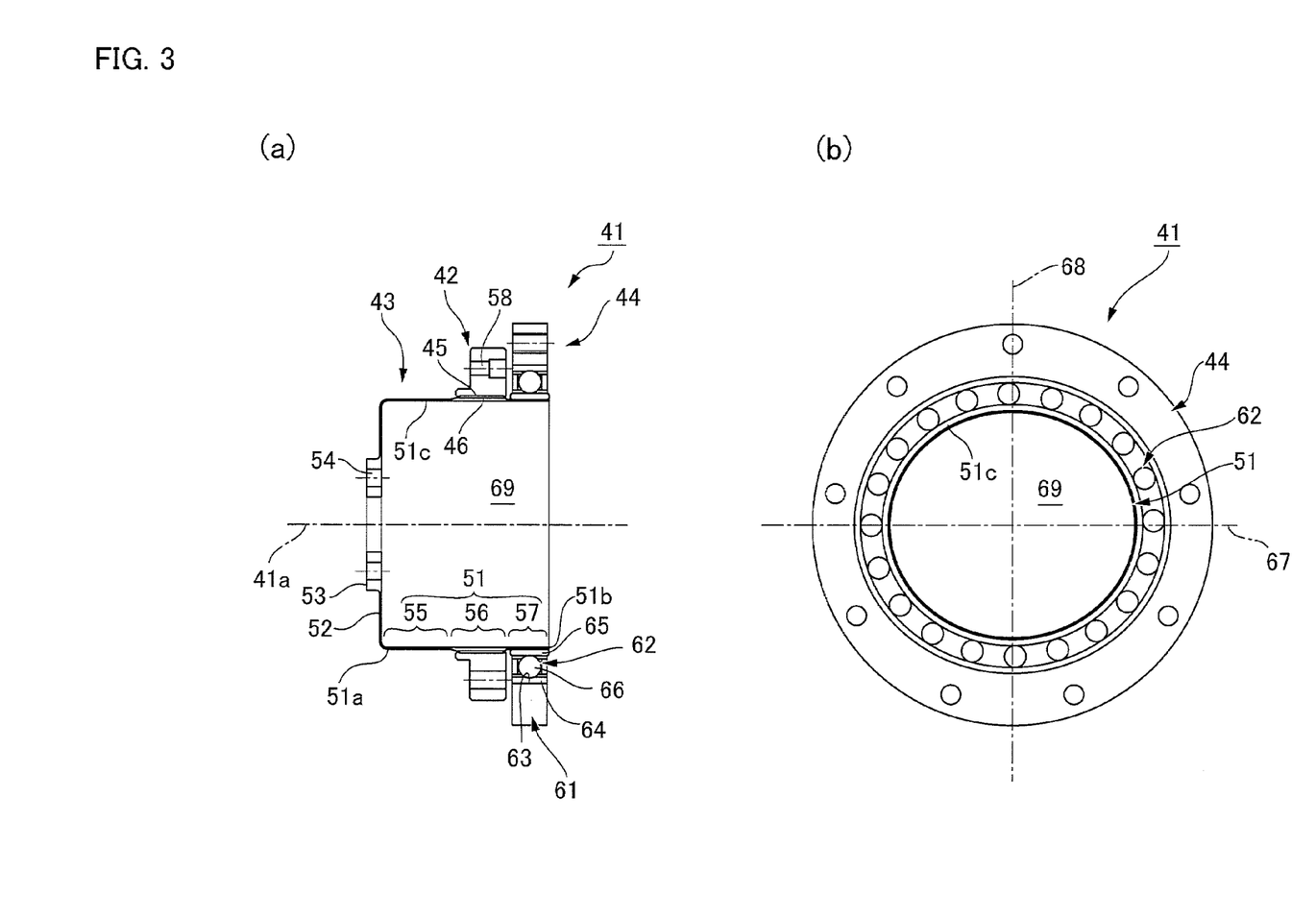

Referring again to FIG. 3, in the cup-type hollow wave gear device 41 configured in this manner, a large internal space 69 stipulated by the internal peripheral surfaces of the diaphragm 52 and the boss 53 is formed on the inside of the cup-shaped flexible externally toothed gear 43, and this internal space 69 opens from the open edge 51b of the flexible externally toothed gear 43. Therefore, unlike in the conventional practice where the wave generator is disposed on the inside of the cylindrical barrel part 51 of the flexible externally toothed gear 43 and the internal space of the flexible externally toothed gear 43 is sealed by the wave generator, there is no formation of any large dead space. The internal space 69 can be effectively utilized as a space for installing components or a space for wiring.

The rigid internally toothed gear 42 and the wave generator 44 are disposed in positions adjacent to each other on the outer side of the flexible externally toothed gear 43. Therefore, the grease-coated range is smaller than in cases in which these regions are disposed separately on the outer side and the inner side of the flexible externally toothed gear 43. Consequently, these regions can be lubricated efficiently.

In the example described above, the pushed cylindrical portion 57 is formed on the side having the open edge 51b, relative to the external-tooth-formed cylindrical portion 56. The pushed cylindrical portion 57 can also be disposed adjacent to the side having the diaphragm 52 relative to the external-tooth-formed cylindrical portion 56. The pushed cylindrical portion 57 can also be formed separated from the external-tooth-formed cylindrical portion 56 by a predetermined distance along the center axis line 41a.

Embodiment 3

Flat-Type Hollow Wave Gear Device

FIG. 5(a) is a schematic cross-sectional view showing an embodiment of a flat-type wave gear device to which the present invention is applied, and (b) is a schematic end surface view of the same. Referring to these drawings for the description, a flat-type hollow wave gear device 71 comprises annular first and second rigid internally toothed gears 72S, 72D, a cylindrical flexible externally toothed gear 73 disposed coaxially on the insides of the first and second rigid internally toothed gears 72S, 72D, and first and second wave generators 74(1), 74(2) disposed coaxially on the outer side of the flexible externally toothed gear 73.

The first and second wave generators 74(1), 74(2), which sandwich the first and second rigid internally toothed gears 72S, 72D, are disposed adjacent to both sides of these gears. The first wave generator 74(1) is disposed adjacent to the first rigid internally toothed gear 72S, to one side in the direction of a center axis line 71a, and the second wave generator 74(2) is disposed adjacent to the second rigid internally toothed gear 72D, to the other side in the direction of the center axis line 71a. The first and second wave generators 74(1), 74(2) cause the flexible externally toothed gear 73 to flex into an ellipsoidal shape, forming a state in which external teeth 75 of the flexible externally toothed gear 73 are meshed with internal teeth 76S, 76D of the first and second rigid internally toothed gears 72S, 72D in two locations (portions positioned on the major axis) separated by 180 degrees in the circumferential direction.

When the wave generator 74 is rotated about the center axis line 71a of the hollow wave gear device 71 by a motor or another high-speed rotation drive source, the positions where the external teeth 75 mesh with the internal teeth 76S, 76D move in the circumferential direction. The number of external teeth 75 is the same as that of the internal teeth 76D, but is fewer by 2n (n being a positive integer) than the number of internal teeth 76S, and there are commonly two fewer external teeth. Therefore, the second rigid internally toothed gear 72D rotates integrally with the flexible externally toothed gear 73. When the meshing positions of the first rigid internally toothed gear 72S and the flexible externally toothed gear 73 move in the circumferential direction, relative rotation occurs between the two gears, the rotation corresponding to the difference in the number of teeth between the two gears. When the first rigid internally toothed gear 72S is fixed in place so as to not rotate, for example, the other second rigid internally toothed gear 72D rotates integrally with the flexible externally toothed gear 73, and output rotation is acquired from this gear.

The flexible externally toothed gear 73 includes a cylindrical barrel part 81 capable of flexing in the radial direction, and the sides of this cylindrical barrel part 81 are first and second open edges 81a, 81b. The cylindrical barrel part 81 includes, in order from the first open edge 81a along the direction of the center axis line 71a, a first pushed cylindrical portion 87(1) of a fixed length, an external-tooth-formed cylindrical portion 86 on which the external teeth 75 are formed, and a second pushed cylindrical portion 87(2), and the distal end edge of the second pushed cylindrical portion 87(2) is the other open edge 81b. The first pushed cylindrical portion 87(1) is pushed inward from the outside and made to flex into an ellipsoidal shape by the first wave generator 74(1), and the second pushed cylindrical portion 87(2) is pushed inward from the outside and made to flex into an ellipsoidal shape by the second wave generator 74(2), as will be described hereinafter.

The first and second rigid internally toothed gears 72S, 72D are disposed adjacently so as to concentrically enclose the external-tooth-formed cylindrical portion 86. Both of the first and second rigid internally toothed gears 72S, 72D are connected and fixed to a fixed-side member or a load-side member (not shown).

The first and second wave generators 74(1), 74(2) have the same configuration, and these wave generators are disposed so as to concentrically enclose the first and second pushed cylindrical portions 87(1), 87(2), respectively, of the cylindrical barrel part 81 in positions adjacent to the respective sides having the open edges 81a, 81b, relative to the first and second rigid internally toothed gears 72S, 72D. The first and second wave generators 74(1), 74(2), which are integrated, rotate in the same direction at the same speed.

The wave generators 74(1), 74(2) comprise a rigid annular portion 91 and a wave bearing 92 mounted to the inner side of this annular portion. An internal peripheral surface 93 of the annular portion 91 is a surface of fixed width, having an ellipsoidal contour. The wave bearing 92 comprises an outer race 94 and an inner race 95 capable of flexing in the radial direction, which are attached to the ellipsoidally contoured inner peripheral surface 93 and made to flex into an ellipsoidal shape, and balls 96 are inserted so as to be capable of rolling in the ellipsoidal trajectory formed between the races. The first and second pushed cylindrical portions 87(1), 87(2) of the cylindrical barrel part 81 of the flexible externally toothed gear 73 are both fitted into the inside surface of the ellipsoidally flexed inner race 95, and made to flex into an ellipsoidal shape.

Figure 5:
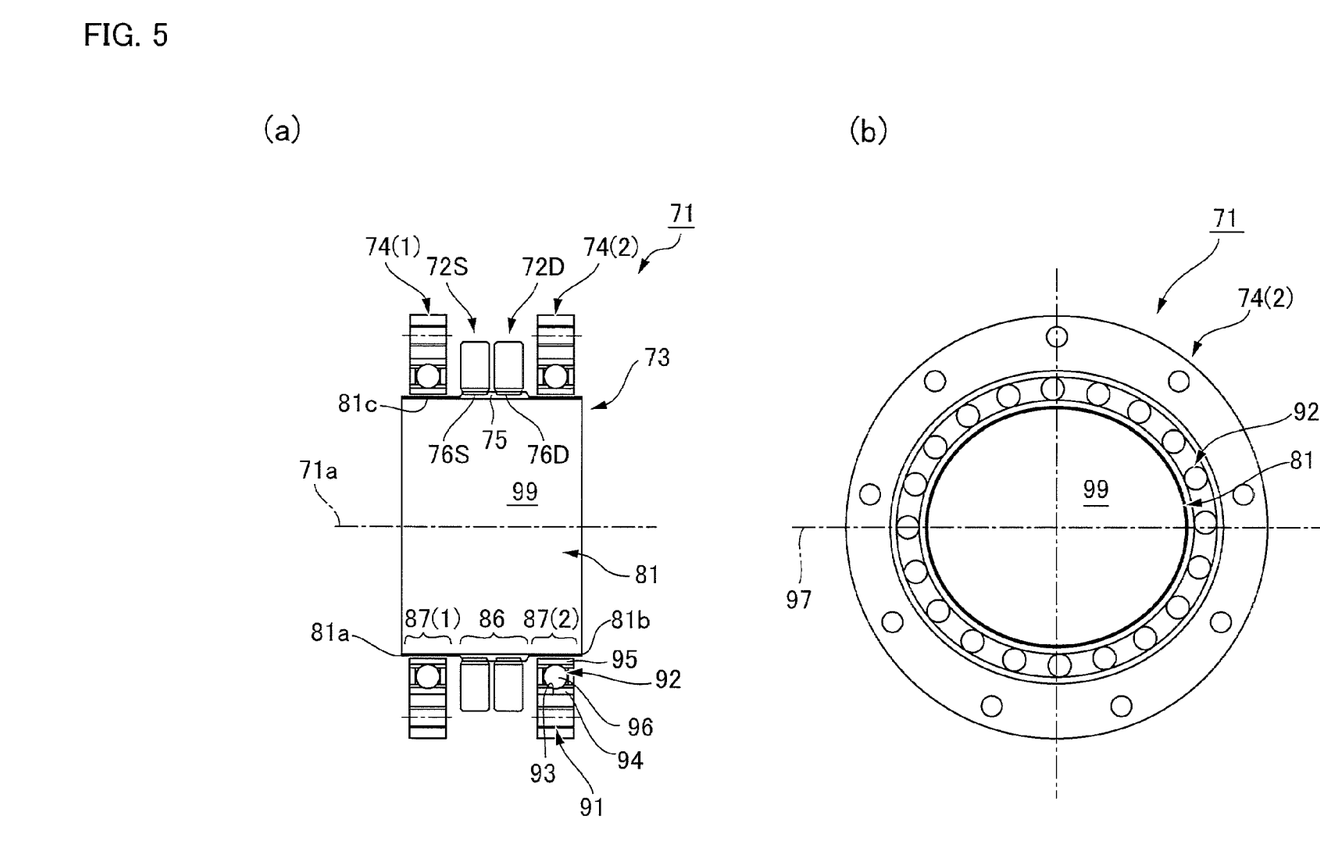
Figure 6:
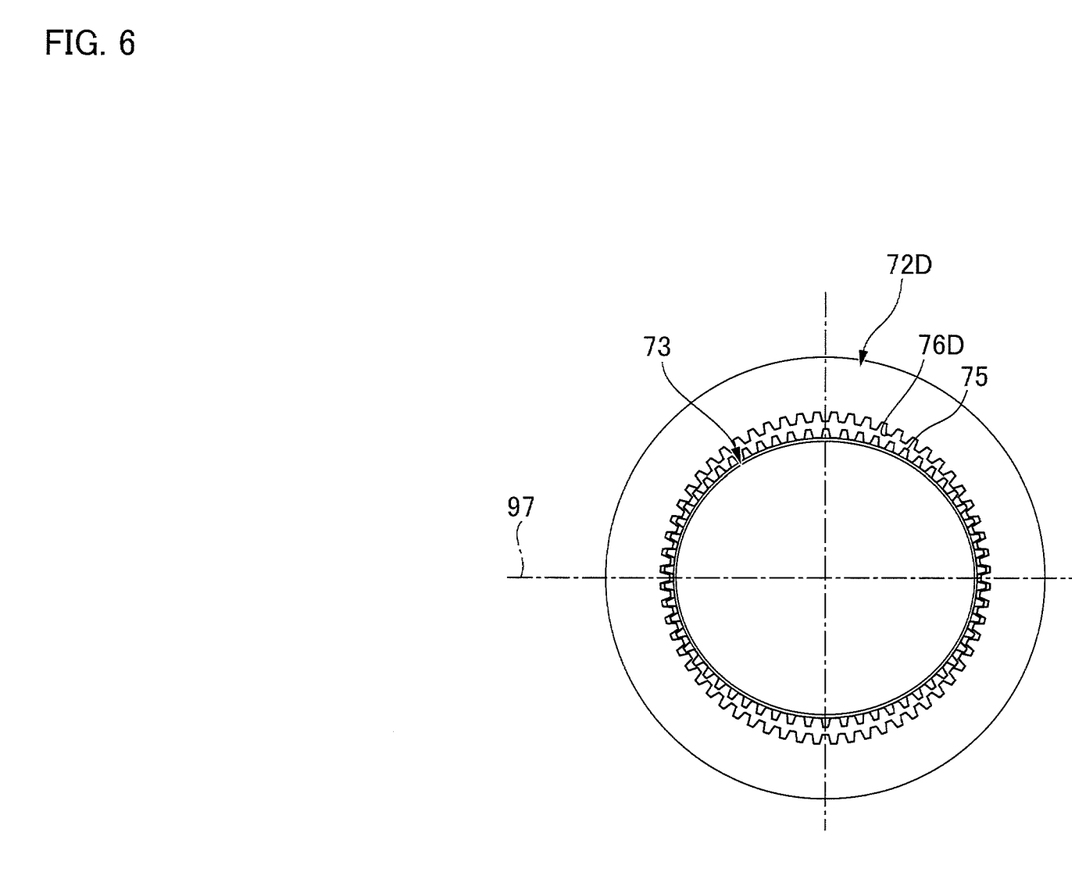
FIG. 6 is a transverse cross-sectional view schematically showing the flexed state of the flat-type flexible externally toothed gear of FIG. 5.

FIG. 6 is a transverse cross-sectional view schematically showing the flexed state of the flexible externally toothed gear 73 and the meshed state of the second rigid internally toothed gear 72D. As can be seen from FIGS. 5(*b*) and 6, the first and second pushed cylindrical portions 87(1), 87(2) of the cylindrical barrel part 81 are both pushed inward along the radius from the outside and made to flex into an ellipsoidal shape by the first and second wave generators 74(1), 74(2), and the cylindrical barrel part 81 thereby flexes into the same ellipsoidal shape in the positions on the center axis line 71a. Consequently, the external teeth 75 of the external-tooth-formed cylindrical portion 86 are also made to flex into an ellipsoidal shape, forming a state in which the external teeth in positions on the major axis 97 are meshed with the internal teeth in the first and second rigid internally toothed gears 72S, 72D.

Therefore, the wave generator 74 disposed on the outer side of the flexible externally toothed gear 73 functions in the same manner as a conventional wave generator which would be disposed in a position facing the first and second rigid internally toothed gears 72S, 72D on the inside of the flexible externally toothed gear 73.

Referring again to FIG. 5, in the flat-type hollow wave gear device 71 configured in this manner, a hollow part 99 is formed extending through the center of the device in the direction of the center axis line 71a. This hollow part 99 is stipulated by the internal peripheral surface 81c of the cylindrical barrel part 81 of the flexible externally toothed gear 73.

Therefore, according to the hollow wave gear device 71, unlike cases in which a wave gear device is disposed on the inner side of the cylindrical barrel part 81 of the flexible externally toothed gear 73, the inside diameter dimension of the hollow part 99 is not restricted by the inside diameter dimension of the through-hole formed in the wave generator, and the inside diameter dimension of the hollow part 99 can be made much larger than in conventional practice.

The first and second rigid internally toothed gears 72S, 72D and the first and second wave generators 74(1), 74(2) are disposed in parallel on the outer side of the flexible externally toothed gear 73. Therefore, the grease-coated range is smaller than in cases in which these regions are disposed on the outer side and inner side of the flexible externally toothed gear 73. Consequently, these regions can be lubricated efficiently.

In the example above, the first and second pushed cylindrical portions 87(1), 87(2) are disposed adjacently on both sides of the external teeth cylindrical portion 86. These portions can also be disposed as being spaced apart. Another possibility is to omit one pushed cylindrical portion and one wave generator, and to employ a configuration comprising a single pushed cylindrical portion and a single wave generator.

The invention claimed is:

1. A wave gear device comprising a rigid internally toothed gear, a flexible externally toothed gear disposed on the inside of the rigid internally toothed gear, and a wave generator which causes the flexible externally toothed gear to flex into an ellipsoidal shape and partially mesh with the rigid internally toothed gear and which causes the meshing positions of the two gears to move in a circumferential direction;

the flexible externally toothed gear having a cylindrical barrel part having an open edge in at least one end and being capable of flexing in a radial direction;

the cylindrical barrel part has an inner peripheral surface with no internal teeth and an external-tooth-formed portion where external teeth are formed, and a pushed portion pushed in the radial direction by the wave generator in order to cause the external-tooth-formed portion to flex into an ellipsoidal shape;

the external-tooth-formed portion and the pushed portion being formed in different regions in the cylindrical barrel part along a direction of a center axis line of the flexible externally toothed gear; and the wave generator being disposed on an outside of the cylindrical barrel part, and being adapted for pushing the pushed portion radially inward from the outside and causing the pushed portion to flex into an ellipsoidal shape, and wherein no structural components of the wave gear device are located on a radially inward side of the cylindrical barrel part of the flexible externally toothed gear.

2. The wave gear device according to claim 1, wherein:
the external-tooth-formed portion and the pushed portion are formed in positions that are adjacent along the center axis line.

3. The wave gear device according to claim 2, wherein:
the pushed portion is a portion of a predetermined length along the center axis line from the open edge in the cylindrical barrel part.

4. The wave gear device according to claim 1, wherein:
the wave generator has a rigid member having an ellipsoidally contoured internal peripheral surface, and a wave bearing attached to an internal peripheral surface in a state of being flexed into an ellipsoidal shape; and
the pushed portion of the cylindrical barrel part is made to flex into an ellipsoidal shape by an internal peripheral surface of an inner race of the wave bearing.

5. The wave gear device according to claim 1, wherein:
the flexible externally toothed gear is a silk-hat-shaped flexible externally toothed gear in which a diaphragm widens outward in the radial direction from the other end of the cylindrical barrel part; and
an internal peripheral surface of the cylindrical barrel part stipulates a device hollow part extending through a device center portion along the center axis line.

6. The wave gear device according to claim 1, wherein:
the flexible externally toothed gear is a cup-shaped flexible externally toothed gear in which a diaphragm widens inward in the radial direction from the other end of the cylindrical barrel part.

7. The wave gear device according to claim 1, wherein:
the rigid internally toothed gear has a first rigid internally toothed gear having the same number of teeth as the flexible externally toothed gear and a second rigid internally toothed gear having a greater number of teeth than the flexible externally toothed gear, the first and second rigid internally toothed gears being coaxial and disposed adjacent along the center axis line;
as the open edge of the cylindrical barrel part, a first open edge and a second open edge being formed on both sides of the cylindrical barrel part;
as the pushed portion of the cylindrical barrel part, a first pushed portion and a second pushed portion being formed on either side of the external-tooth-formed portion along the center axis line; and
as the wave generator, a first wave generator which pushes the first pushed portion radially inward from the outside to cause the first pushed portion to flex into an ellipsoidal shape, and a second wave generator which pushes the second pushed portion radially inward from the outside to cause the second pushed portion to flex into an ellipsoidal shape being formed.

8. A flexible externally toothed gear for a wave gear device, the flexible externally toothed gear comprising:
   a cylindrical barrel part having an open edge in one end and being capable of flexing in a radial direction, and a diaphragm which widens outward or inward in the radial direction from another end of the cylindrical barrel part;
   the cylindrical barrel part having an external-tooth-formed portion in which external teeth are formed, and a pushed portion pushed in the radial direction by the wave generator according to claim 1 in order to cause the external-tooth-formed portion to flex into an ellipsoidal shape; and
   the external-tooth-formed portion and the pushed portion being formed in different regions in the cylindrical barrel part along a direction of the center axis line of the flexible externally toothed gear;
   wherein no structural components of the wave gear device are located on a radially inward side of the cylindrical barrel part of the flexible externally toothed gear.

9. The flexible externally toothed gear for a wave gear device according to claim 8, wherein:
   the external-tooth-formed portion and the pushed portion are formed in positions that are adjacent along the center axis line.

10. The flexible externally toothed gear for a wave gear device according to claim 9, wherein:
    the pushed portion is a portion of a predetermined length along the center axis line from the open edge in the cylindrical barrel part.

11. The flexible externally toothed gear for a wave gear device according to claim 8, wherein:
    the diaphragm is formed to widen radially outward from the other end of the cylindrical barrel part so as to form a silk hat shape.

12. The flexible externally toothed gear for a wave gear device according to claim 8, wherein:
    the diaphragm is formed to extend radially inward from the other end of the cylindrical barrel part so as to form a cup shape.

13. A flexible externally toothed gear for a wave gear device, the flexible externally toothed gear comprising:
    a cylindrical barrel part capable of flexing in a radial direction, a first open edge formed in one end of the cylindrical barrel part, and a second open edge formed in another end of the cylindrical barrel part;
    the cylindrical barrel part having an external-tooth-formed portion in which external teeth are formed, and a pushed portion pushed in the radial direction by the wave generator according to claim 1 in order to cause the external-tooth-formed portion to flex into an ellipsoidal shape; and
    as the pushed portion, a first pushed portion and a second pushed portion formed on either side of the external-tooth-formation portion along the center axis line being formed;
    wherein no structural components of the wave gear device are located on a radially inward side of the cylindrical barrel part of the flexible externally toothed gear.

14. The flexible externally toothed gear for a wave gear device according to claim 13, wherein:
    the first pushed portion and the second pushed portion are formed in positions adjacent to the external-tooth-formed portion along the center axis line.

15. The flexible externally toothed gear for a wave gear device according to claim 14, wherein:
    the first pushed portion is a portion of a predetermined width along the center axis line from the first open edge in the cylindrical barrel part; and
    the second pushed portion is a portion of a predetermined width along the center axis line from the second open edge in the cylindrical barrel part.

* * * * *